(12) United States Patent
Hague et al.

(10) Patent No.: US 7,626,579 B2
(45) Date of Patent: Dec. 1, 2009

(54) SANITIZING A TOUCH PANEL SURFACE

(75) Inventors: Richard David Hague, San Jose, CA (US); Mark Bolt, Castro Valley, CA (US); Chris Jason Ullrich, Santa Cruz, CA (US); Munibe M. Bakircioglu, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 570 days.

(21) Appl. No.: 11/555,384

(22) Filed: Nov. 1, 2006

(65) Prior Publication Data

US 2008/0100584 A1    May 1, 2008

(51) Int. Cl.
G06F 3/043 (2006.01)
(52) U.S. Cl. .................. 345/177; 345/156; 345/173; 178/18.01; 178/18.03; 178/18.04; 349/12
(58) Field of Classification Search ............. 345/156, 345/173, 174, 175, 176, 177, 178; 178/18.01, 178/18.03, 18.04, 18.05, 18.06, 18.07, 18.08, 178/18.09, 18.11
See application file for complete search history.

(56) References Cited

U.S. PATENT DOCUMENTS

| | | | | |
|---|---|---|---|---|
| 5,977,867 A | * | 11/1999 | Blouin | 340/407.2 |
| 6,091,406 A | * | 7/2000 | Kambara et al. | 345/177 |
| 6,504,583 B2 | | 1/2003 | Li et al. | |

FOREIGN PATENT DOCUMENTS

WO    WO0043831    *    7/2000

OTHER PUBLICATIONS

Antibacterial Touch Screen Developed for Hospital, Cleanroom Use, http://www.aegisasia.com/touchscreen.html; printed on Oct. 13, 2006.
"Non-Contact Ultrasound (NCU), Phenomenally High Efficiency Transducers—50 kHz to >5.0 MHz," NCU Catalog, the ultran group, p. 1-13, printed on Oct. 13, 2006.
"Fujitsu Develops Touch Panel Screen with Light Transparency of 98% Using Surface Acoustic Waves," http://www.embeddedstar.com/press/content/2002/11/embedded6301.html, Nov. 27, 2002.
"Triple quarter-Wave Transducer Designs," Sound Technology Inc., State College, PA, Copyright 2005, 2006, printed on Oct. 13, 2006.

* cited by examiner

Primary Examiner—My-Chau T Tran
(74) Attorney, Agent, or Firm—Womble Carlyle Sandridge & Rice, PLLC

(57) ABSTRACT

A touch panel system that sanitizes a touch panel surface includes a substrate coupled to the touch panel surface. The system further includes an impedance interface coupled to the touch panel surface and a vibration source coupled to the impedance interface. The vibration source vibrates the substrate to generate pressure waves which destroy contaminants on the touch panel surface.

19 Claims, 2 Drawing Sheets

SANITIZING A TOUCH PANEL SURFACE

FIELD OF THE INVENTION

One embodiment of the present invention is directed to touch panels. More particularly, one embodiment of the present invention is directed to sanitizing a touch panel surface.

BACKGROUND INFORMATION

Touch panels have become more and more popular as input sources for computers and other devices. A touch is sensed by a touch panel when a finger or a stylus comes into contact with the outermost surface of the touch panel. The contact is translated into x and y coordinates of the finger or stylus on the panel. Some touch panels are transparent overlays placed over a display. Other touch panels are non-transparent devices typically used to control cursor movement on a portable computer, for example, or as pen input devices for applications including writing or signature input to a computer.

However, most touch panel surfaces require direct contact with the skin of the user's finger, and public touch panels such as automatic teller machines ("ATMs") are touched by many different users. These panels provide a suitable home for bacteria, fungi, algae, and other organisms which thrive and propagate based on the availability of appropriate amounts of moisture, temperature, nutrients, and receptive surfaces. Further, as these organisms thrive, the variety of chemicals that these organisms produce are also known to affect the human user. Thus, these microorganisms, as well as their metabolic products (collectively, "contaminants") can pose serious health risks to users ranging from minor skin irritation to more serious toxic response and disease. With the increased popularity of such touch panels, the public is becoming increasingly aware of and concerned with the presence of microorganisms on these panels and the potential consequences resulting from contact with such contaminated surfaces.

Known methods for keeping touch panel surfaces clean and sanitized include wiping the screens with a liquid antiseptic solution. However, this can only be done periodically and is not a long-lasting solution since the liquid will evaporate. Other known methods include incorporating antimicrobial agents within the screen. However, these agents cannot account for the wide range of organisms that can potentially accumulate on the screen and will eventually lose their effectiveness.

Based on the foregoing, there is a need for a system and method for sanitizing touch panel surfaces to effectively eliminate hazards to users.

SUMMARY OF THE INVENTION

One embodiment of the present invention is a touch panel system that sanitizes a touch panel surface. The system includes a substrate coupled to the touch panel surface. The system further includes an impedance interface coupled to the touch panel surface and a vibration source coupled to the impedance interface. The vibration source vibrates the substrate to generate pressure waves which destroy contaminants on the touch panel surface.

DETAILED DESCRIPTION

One embodiment of the present invention is a system for sanitizing a touch panel surface by generating high frequency vibrations on a substrate applied on the surface. The vibrations induce pressure waves and cavitation to destroy contaminants on the surface or mechanically separate contaminants from the surface.

Figure 1:
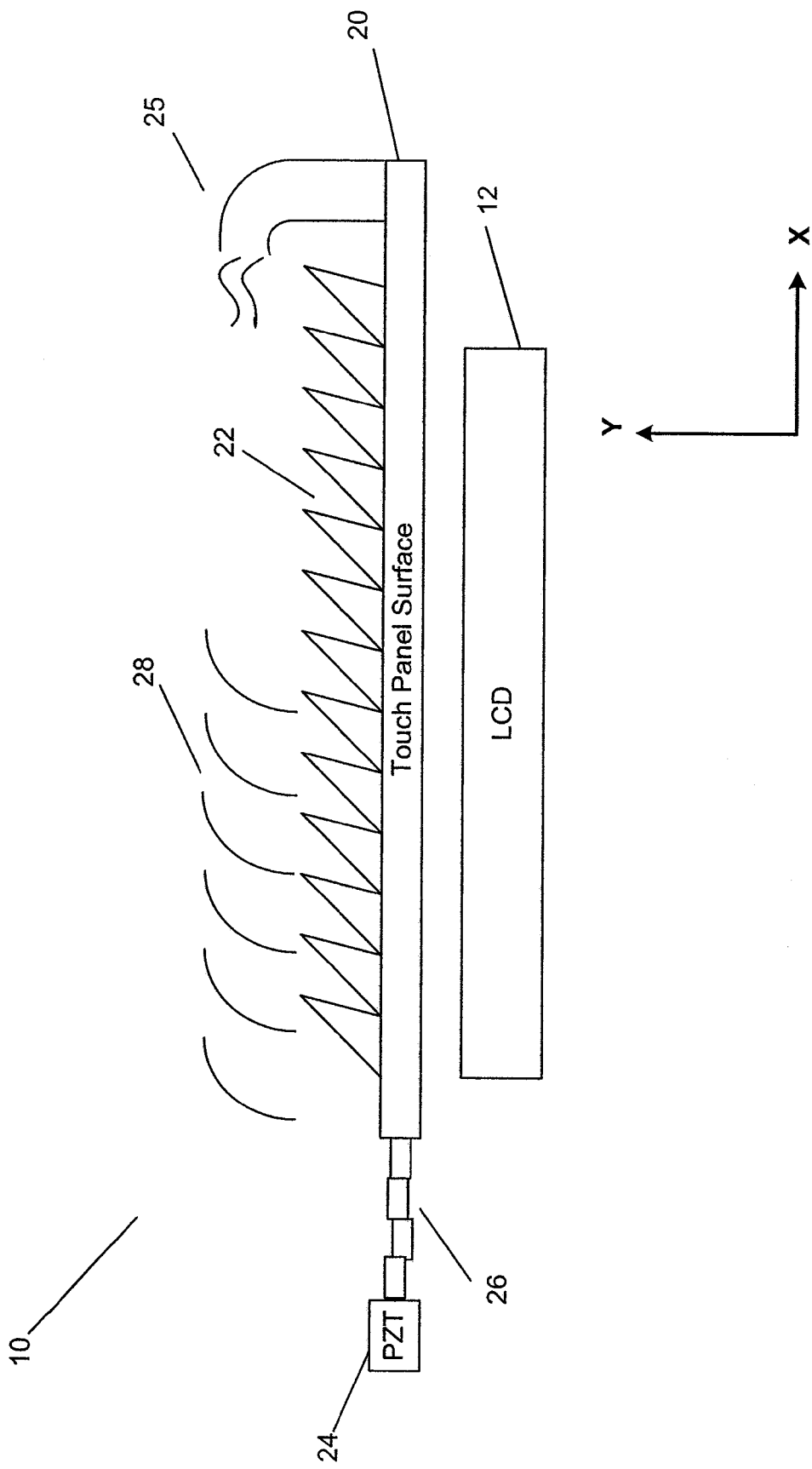
FIG. 1 is a side view of a touch panel that includes a touch panel surface sanitizer in accordance with one embodiment of the present invention.

FIG. 1 is a side view of a touch panel 10 that includes a touch panel surface sanitizer in accordance with one embodiment of the present invention. Touch panel 10 includes a touch panel surface 20 made of glass or other material, and a liquid crystal diode ("LCD") display 12 for displaying information that can be viewed through the transparent or semi-transparent touch panel surface 20. In one embodiment, a gap exists between LCD display 12 and touch panel surface 20 to accommodate movement of touch panel surface 20 in the X or Y direction. Movement of touch surface 20 in the Y direction can provide, for example, a haptic or vibrotactile feedback to a user of touch panel 10. One type of haptic feedback can be a vibration applied to touch panel surface 20 by an actuator when a user touches surface 20. One example of such haptic feedback is disclosed in U.S. Pat. No. 6,429,846, entitled "Haptic feedback for touchpads and other touch controls" and assigned to Immersion Corp.

A piezoelectric crystal transducer ("PZT") 24 is coupled to touch panel surface 20 through impedance matching interface 26. PZT 24 generates high frequency vibrations. In one embodiment, the frequency of the vibrations are in the range of approximately 20-100 KHz. Any other device capable of generating vibrations in this range can be substituted for PZT 24 in other embodiments of the present invention.

Impedance matching interface 26 is placed between PZT 24 and touch panel surface 20 to enable high efficiency ultrasonic energy transduction. In one embodiment, impedance matching interface 26 is formed of multiple layers of polyurethane material and transfers the high frequency waves generated by PZT 24 to touch panel surface 20.

A non-visible substrate 22 is placed on touch panel surface 20. Substrate 22 enables the creation of high pressure regions on touch panel surface 20. In one embodiment, substrate 22 is a coating that may be applied through chemical deposition. In another embodiment, substrate 22 is a transparency that is applied to surface 20. Substrate 22 should be durable so that frequent touches on surface 20 does not wear it out, should include edges perpendicular to the X axis to generate pressure waves 28 on surface 20 when vibrated by PZT 24, and should not significantly interfere with the transmission of light. In another embodiment, substrate 22 can be a liquid that is frequently reapplied to surface 20 when needed to facilitate cleaning.

In operation, PZT 24 through interface 26 causes surface 20 to vibrated in generally the X direction at approximately 20-100 KHz. At this frequency, the air surrounding substrate 22 is compressed to create pressure waves 28. Pressure waves 28 will destroy substantially all of the bacteria and other microorganisms and contaminants that have formed or have been applied to surface 20 through non-contact ultrasound and/or cavitation.

In one embodiment, PZT 24 is computer controlled so that it can be cycled through a large range of frequencies, thus creating pressure waves across the frequency range. It is known that some bacteria, microorganisms, and other contaminants have a naturally occurring frequency, and the generation of a frequency at this natural frequency will destroy the material by breaking down the chemical bonds in the material. Generated frequencies may also weaken or destroy the adhesive bonds that join contaminants with the touch panel surface. Thus, PZT 24 can be activated to generate frequencies that are at the natural frequencies of all known materials that are desired to be destroyed.

In another embodiment, the pressure waves may destroy some or all of the contaminants present on surface 20, leaving non-toxic compounds on surface 20. However, other contaminants, rather than being destroyed, will have their bonds to surface 20 merely weakened. Therefore, an air mechanism 25 can be used to induce an airflow across surface 20 to blow the non-toxic compounds and compounds having weakened bonds into the air, thus leaving surface 20 contaminant free.

Figure 2:
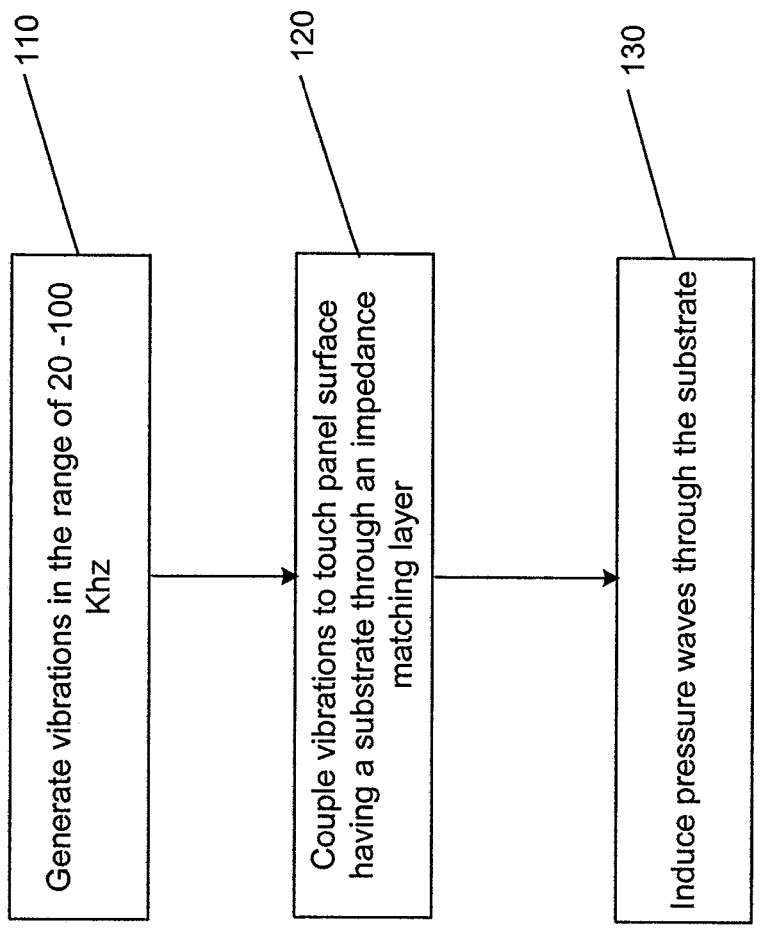
FIG. 2 is a flow diagram of the functionality of one embodiment of the present invention to sanitize a touch panel surface.

FIG. 2 is a flow diagram of the functionality of one embodiment of the present invention to sanitize a touch panel surface. PZT 24 generates vibrations in the range of 20-100 Khz (110). The vibrations are coupled to the touch panel surface having a substrate through the impedance matching layer (120). The vibrations induce pressure waves through the substrate (130). The pressure waves destroy or weaken the bonds of contaminants.

As disclosed, embodiments of the present invention use vibrations to generate pressure waves that destroy contaminants on a touch panel surface without the need of human intervention or cleaning chemicals. Therefore, users will have less health concerns when using publicly available touch panels.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A sanitizing touch panel system comprising:
 a touch panel surface;
 a substrate coupled to said touch panel surface;
 an impedance interface coupled to said touch panel surface; and
 a vibration source coupled to said impedance interface;
 wherein said vibration source causes vibrations on said substrate to generate pressure waves.

2. The touch panel system of claim 1, wherein said impedance interface comprises a plurality of polyurethane layers.

3. The touch panel system of claim 1, wherein said vibration source comprises a piezoelectric transducer.

4. The touch panel system of claim 1, wherein said substrate comprises a coating.

5. The touch panel system of claim 1, wherein said substrate comprises a liquid.

6. The touch panel system of claim 1, wherein said substrate comprises a transparency.

7. The touch panel system of claim 1, wherein said vibration source generates vibrations in the range of approximately 20-100 KHz.

8. The touch panel system of claim 1, wherein said vibrations cause said substrate to generate pressure waves on said surface.

9. The touch panel system of claim 1, wherein said surface collects contaminants having one or more natural frequencies, and said vibration source generates vibrations approximately equal to the natural frequencies.

10. The touch panel system of claim 1, further comprising an air mechanism.

11. A method of sanitizing a touch panel surface comprising:
 generating vibrations;
 coupling the vibrations to the touch panel surface, wherein the surface is coupled to a substrate; and
 inducing pressure waves through the substrate.

12. The method of claim 11, wherein the vibrations are generated by a piezoelectric transducer.

13. The method of claim 11, wherein the coupling the vibrations comprises sending the vibrations through a plurality of impedance matching layers.

14. The method of claim 12, wherein the vibrations are generated in the range of approximately 20-100 KHz.

15. The method of claim 11, further comprising:
 inducing an airflow across the touch panel surface.

16. The method of claim 11, further comprising:
 determining a natural frequency of at least one contaminant that may be present on the touch panel surface; and
 generating the vibrations at the natural frequency.

17. A system for sanitizing a touch panel surface comprising:
 means for generating vibrations;
 means for coupling the vibrations to the touch panel surface, wherein the surface is coupled to a substrate; and
 means for inducing pressure waves through the substrate.

18. The system of claim 17, further comprising:
 means for inducing an airflow across the touch panel surface.

19. The system of claim 17, further comprising:
 means for determining a natural frequency of at least one contaminant that may be present on the touch panel surface; and
 means for generating the vibrations at the natural frequency.

* * * * *